(12) United States Patent
Chi et al.

(10) Patent No.: US 11,916,803 B2
(45) Date of Patent: Feb. 27, 2024

(54) DATA TRANSMISSION METHOD AND APPARATUS, GATEWAY, CHIP, AND STORAGE MEDIUM

(71) Applicant: Huawei Technologies Co., Ltd., Shenzhen (CN)

(72) Inventors: Fei Chi, Dongguan (CN); Xifeng Wan, Dongguan (CN); Yiming Wang, Dongguan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/660,326

(22) Filed: Apr. 22, 2022

(65) Prior Publication Data

US 2022/0247692 A1 Aug. 4, 2022

Related U.S. Application Data

(63) Continuation of application No. PCT/CN2021/071462, filed on Jan. 13, 2021.

(30) Foreign Application Priority Data

Feb. 28, 2020 (CN) .......................... 202010131309.X

(51) Int. Cl.
*H04L 47/62* (2022.01)
*H04L 47/2483* (2022.01)
*H04L 47/2491* (2022.01)

(52) U.S. Cl.
CPC ........ *H04L 47/621* (2013.01); *H04L 47/2483* (2013.01); *H04L 47/2491* (2013.01)

(58) Field of Classification Search
CPC ............... H04L 47/621; H04L 47/2483; H04L 47/2491; H04Q 2011/0064;
(Continued)

(56) References Cited

U.S. PATENT DOCUMENTS 8,634,431 B1 1/2014 Chiang et al.
2009/0042924 A1 2/2009 Bourrie et al.
(Continued)

FOREIGN PATENT DOCUMENTS

CN 100345850 C 10/2007
CN 101102157 A 1/2008
(Continued)

OTHER PUBLICATIONS

Carlos A. Astudillo and Nelson L. S. Da Fonseca, Standard-Compliant QoS Provisioning Scheme for LTE/EPON Integrated Networks, 2014, IEEE Wireless Communications, pp. 44-51 (Year: 2014).*

(Continued)

*Primary Examiner* — Kwang B Yao
*Assistant Examiner* — Syed M Bokhari
(74) *Attorney, Agent, or Firm* — Slater Matsil, LLP

(57) ABSTRACT

A method includes: mapping a to-be-transmitted service flow to a virtual connection based on a mapping relationship between an identifier of the to-be-transmitted service flow and an identifier of the virtual connection; mapping the to-be-transmitted service flow to a virtual bearer based on a mapping relationship between the identifier of the virtual connection and an identifier of the virtual bearer; and mapping the to-be-transmitted service flow to a virtual bearer queue based on a mapping relationship between a quality of service characteristic identifier of the to-be-transmitted service flow and an identifier of the virtual bearer queue in the virtual bearer, to transmit the to-be-transmitted service flow to an OLT.

18 Claims, 5 Drawing Sheets

(58) Field of Classification Search
CPC ... H04Q 2011/0084; H04Q 2011/0086; H04Q 11/67; H04W 28/0263; H04W 28/0268
USPC .......................................................... 370/412
See application file for complete search history.

(56) References Cited

U.S. PATENT DOCUMENTS

| | | | |
|---|---|---|---|
| 2019/0028920 A1 | 1/2019 | Pan | |
| 2021/0127319 A1* | 4/2021 | Huang | H04W 40/02 |
| 2021/0160768 A1* | 5/2021 | Akman | H04W 76/12 |

FOREIGN PATENT DOCUMENTS

| | | | |
|---|---|---|---|
| CN | 101257487 A | 9/2008 | |
| CN | 102480652 A | 5/2012 | |
| CN | 109392024 A | 2/2019 | |
| EP | 2019519 B1 | 1/2009 | |
| KR | 20080052736 A | 6/2008 | |
| WO | 2010138661 A1 | 12/2010 | |
| WO | 2019175805 A1 | 9/2019 | |

OTHER PUBLICATIONS

Arokkiam, J.A. et al., "Optimised QoS-aware DBA mechanisms in XG-PON for upstream traffic in LTE Backhaul", 2016 4th International Conference on Future Internet of Things and Cloud Workshops, Aug. 22-24, 2016, 8 pages.

\* cited by examiner

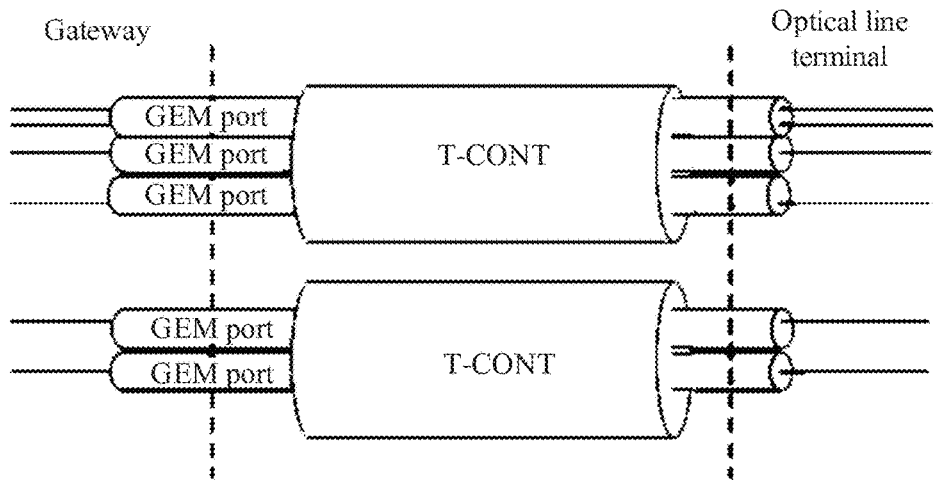

FIG. 2

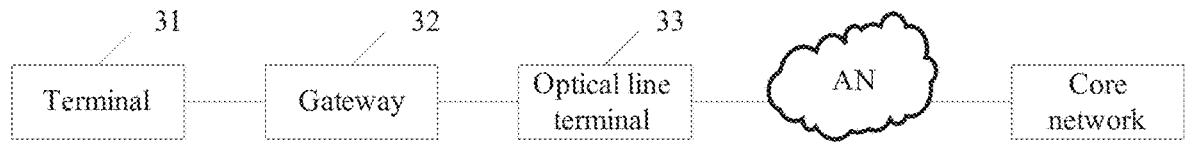

FIG. 3

```
A gateway maps a to-be-transmitted service flow to a virtual
connection based on a mapping relationship between an identifier of    S401
the to-be-transmitted service flow in a mobile network and an
identifier of the virtual connection The gateway maps the to-be-transmitted service flow to a virtual
bearer based on a mapping relationship between the identifier of the   S402
virtual connection and an identifier of the virtual bearer The gateway maps the to-be-transmitted service flow to a virtual
bearer queue based on a mapping relationship between a quality of
service characteristic identifier of the to-be-transmitted service flow    S403
and an identifier of the virtual bearer queue in the virtual bearer, to
transmit the to-be-transmitted service flow to an optical line terminal
```

FIG. 4

DATA TRANSMISSION METHOD AND APPARATUS, GATEWAY, CHIP, AND STORAGE MEDIUM

CROSS-REFERENCE TO RELATED APPLICATIONS

This application is a continuation of International Application No. PCT/CN2021/071462, filed on Jan. 13, 2021, which claims priority to Chinese Patent Application No. 202010131309.X, filed on Feb. 28, 2020. The disclosures of the aforementioned applications are hereby incorporated by reference in their entireties.

TECHNICAL FIELD

This application relates to the field of communications technologies, and in particular, to a data transmission method and apparatus, a gateway, a chip, and a storage medium.

BACKGROUND

At present, various industries have various personalized requirements for transmission quality of mobile networks. With development of a fifth generation (5G) mobile communications system, in a protocol data unit (PDU) session, based on a quality of service flow identifier (QFI), most refined distinction of a user service flow granularity is performed, and quality of service guarantee of different service-level agreements (SLAs) is provided, which provides 5G customers with customizable network services based on QoS flows (namely, service flows).

A passive optical network (PON) is a passive optical network with a point-to-multipoint structure. The PON includes an optical line terminal (OLT), an optical distribution network (ODN), and an optical network unit/terminal (ONU/ONT). The PON (Passive Optical Network) includes an Ethernet passive optical network EPON (Ethernet PON) and a gigabit passive optical network GPON (Gigabit PON). The GPON uses a generic encapsulation method (GEM), and can bear a plurality of services and provide quality of service guarantee for various types of services, which shows the potential of a broadband optical access technology in the future. A GEM frame is a smallest service bearing unit and a most basic data structure in a GPON technology. A transmission container (T-CONT) is a container for bearing a service in an upstream direction of the GPON. All GEM ports need to be mapped to the T-CONT, and the OLT transmits a service flow to a core network side through dynamic bandwidth allocation (DBA) scheduling. The T-CONT is an upstream traffic scheduling unit of the DBA, that is, a service container. Each T-CONT is uniquely identified by an allocation identifier (Alloc-ID). The Alloc-ID is allocated by each GPON port of the OLT. In other words, ONUs at a same GPON port of the OLT do not have T-CONTs with a same Alloc-ID. In an upstream transmission direction, the ONU maps a service flow to a corresponding GEM port based on a VLAN and/or 802.1p of the service flow. The GEM port carries the service flow and then maps the service flow to different types of T-CONTs. However, one T-CONT includes a plurality of T-CONT queues, and the ONU may schedule service flows in the T-CONT queues based on 802.1p carried in a packet.

However, when upstream transmission is performed on a service flow in a 5G customized service in the GPON, in a conventional technology, a QoS characteristic of the service flow cannot be considered for such upstream data transmission in the GPON. In other words, scheduling manners for such service flows in the GPON and a 5G network are inconsistent. As a result, scheduling of such service flows may be delayed.

SUMMARY

This application provides a data transmission method and apparatus, a gateway, a chip, and a storage medium, so that a service flow scheduling manner in a fixed-mobile convergence network is consistent with a service flow scheduling manner in a mobile network, to avoid delayed scheduling of a service flow.

According to a first aspect, this application provides a data transmission method, where the method is applied to a part or all of a gateway. The method includes: mapping a to-be-transmitted service flow to a virtual connection based on a mapping relationship between an identifier of the to-be-transmitted service flow in a mobile network and an identifier of the virtual connection, where the virtual connection is a virtual connection between the gateway and an optical line terminal that are corresponding to the to-be-transmitted service flow; mapping the to-be-transmitted service flow to a virtual bearer based on a mapping relationship between the identifier of the virtual connection and an identifier of the virtual bearer, where the virtual bearer is a virtual bearer between the gateway and the optical line terminal that are corresponding to the virtual connection; and mapping the to-be-transmitted service flow to a virtual bearer queue based on a mapping relationship between a quality of service characteristic identifier of the to-be-transmitted service flow and an identifier of the virtual bearer queue in the virtual bearer, to transmit the to-be-transmitted service flow to the optical line terminal.

In this way, the identifier of the to-be-transmitted service flow in the mobile network and the quality of service characteristic identifier of the to-be-transmitted service flow are introduced into a fixed-mobile convergence network, and when the service flow is scheduled, scheduling is performed based on the quality of service characteristic identifier of the to-be-transmitted service flow, which is consistent with a scheduling manner in the mobile network. Therefore, scheduling of the to-be-transmitted service flow is not delayed.

Optionally, a higher priority of the to-be-transmitted service flow indicates a higher priority of the virtual bearer queue. Based on this, it can be ensured that a service flow with a higher priority in the mobile network is preferentially scheduled in the fixed-mobile convergence network.

Optionally, the mapping relationship between the identifier of the to-be-transmitted service flow in the mobile network and the identifier of the virtual connection is preconfigured for the gateway. Alternatively, the mapping relationship between the identifier of the to-be-transmitted service flow in the mobile network and the identifier of the virtual connection is preconfigured for the terminal. Correspondingly, the method further includes: receiving the mapping relationship that is between the identifier of the to-be-transmitted service flow in the mobile network and the identifier of the virtual connection and that is sent by the terminal.

The mapping relationship between the identifier of the to-be-transmitted service flow in the mobile network and the identifier of the virtual connection is preconfigured for the terminal. In this case, the gateway does not need to store or cache mapping relationships between identifiers of to-betransmitted service flows corresponding to all terminals in the mobile network and identifiers of virtual connections, so that storage pressure of the gateway can be reduced.

Optionally, the mapping relationship between the quality of service characteristic identifier of the to-be-transmitted service flow and the identifier of the virtual bearer queue is preconfigured for the gateway. Alternatively, the mapping relationship between the quality of service characteristic identifier of the to-be-transmitted service flow and the identifier of the virtual bearer queue is preconfigured for the terminal. Correspondingly, the method further includes: receiving the mapping relationship that is between the quality of service characteristic identifier of the to-be-transmitted service flow and the identifier of the virtual bearer queue and that is sent by the terminal.

In this case, the gateway does not need to store or cache mapping relationships between quality of service characteristic identifiers of to-be-transmitted service flows corresponding to all terminals and identifiers of virtual bearer queues, so that storage pressure of the gateway can be reduced.

Optionally, before the mapping a to-be-transmitted service flow to a virtual connection based on a mapping relationship between an identifier of the to-be-transmitted service flow in a mobile network and an identifier of the virtual connection, the method further includes: receiving the identifier that is of the to-be-transmitted service flow in the mobile network and that is sent by the terminal, and the quality of service characteristic identifier that is of the to-be-transmitted service flow and that is sent by the terminal.

The following describes an apparatus, a device, a chip, a storage medium, and a computer program product. For effects thereof, refer to effects corresponding to the foregoing method part. Details are not described herein again.

According to a second aspect, this application provides a data transmission apparatus, including: a first mapping module, configured to map a to-be-transmitted service flow to a virtual connection based on a mapping relationship between an identifier of the to-be-transmitted service flow in a mobile network and an identifier of the virtual connection, where the virtual connection is a virtual connection between a gateway and an optical line terminal that are corresponding to the to-be-transmitted service flow; a second mapping module, configured to map the to-be-transmitted service flow to a virtual bearer based on a mapping relationship between the identifier of the virtual connection and an identifier of the virtual bearer, where the virtual bearer is a virtual bearer between the gateway and the optical line terminal that are corresponding to the virtual connection; and a third mapping module, configured to map the to-be-transmitted service flow to a virtual bearer queue based on a mapping relationship between a quality of service characteristic identifier of the to-be-transmitted service flow and an identifier of the virtual bearer queue in the virtual bearer, to transmit the to-be-transmitted service flow to the optical line terminal.

Optionally, a higher priority of the to-be-transmitted service flow indicates a higher priority of the virtual bearer queue.

Optionally, the mapping relationship between the identifier of the to-be-transmitted service flow in the mobile network and the identifier of the virtual connection is preconfigured for the gateway. Alternatively, the mapping relationship between the identifier of the to-be-transmitted service flow in the mobile network and the identifier of the virtual connection is preconfigured for the terminal. Correspondingly, the apparatus further includes: a first receiving module, configured to receive the mapping relationship that is between the identifier of the to-be-transmitted service flow in the mobile network and the identifier of the virtual connection and that is sent by the terminal.

Optionally, the mapping relationship between the quality of service characteristic identifier of the to-be-transmitted service flow and the identifier of the virtual bearer queue is preconfigured for the gateway. Alternatively, the mapping relationship between the quality of service characteristic identifier of the to-be-transmitted service flow and the identifier of the virtual bearer queue is preconfigured for the terminal. Correspondingly, the apparatus further includes: a second receiving module, configured to receive the mapping relationship that is between the quality of service characteristic identifier of the to-be-transmitted service flow and the identifier of the virtual bearer queue and that is sent by the terminal.

Optionally, the apparatus further includes: a third receiving module, configured to receive the identifier that is of the to-be-transmitted service flow in the mobile network and that is sent by the terminal, and the quality of service characteristic identifier that is of the to-be-transmitted service flow and that is sent by the terminal.

According to a third aspect, this application provides a gateway, including: at least one processor; and a memory communicatively connected to the at least one processor.

The memory stores instructions that can be executed by the at least one processor, and the instructions are executed by the at least one processor, to enable the at least one processor to perform the method according to any one of the first aspect or the optional manners of the first aspect.

According to a third aspect, this application provides a chip. The chip is configured to perform the method according to any one of the first aspect or the optional manners of the first aspect.

According to a fourth aspect, this application provides a non-transitory computer-readable storage medium that stores computer instructions, where the computer instructions are used to enable a computer to perform the method according to any one of the first aspect or the optional manners of the first aspect.

According to a fifth aspect, this application provides a computer program product. The computer program product includes computer instructions, where the computer instructions are used to enable a computer to perform the method according to any one of the first aspect or the optional manners of the first aspect.

This application provides a data transmission method and apparatus, a gateway, a chip, and a storage medium. The method includes: mapping a to-be-transmitted service flow to a virtual connection based on a mapping relationship between an identifier of the to-be-transmitted service flow in a mobile network and an identifier of the virtual connection, where the virtual connection is a virtual connection between the gateway and an optical line terminal that are corresponding to the to-be-transmitted service flow; mapping the to-be-transmitted service flow to a virtual bearer based on a mapping relationship between the identifier of the virtual connection and an identifier of the virtual bearer, where the virtual bearer is a virtual bearer between the gateway and the optical line terminal that are corresponding to the virtual connection; and mapping the to-be-transmitted service flow to a virtual bearer queue based on a mapping relationship between a quality of service characteristic identifier of the to-be-transmitted service flow and an identifier of the virtual bearer queue in the virtual bearer, to transmit the to-betransmitted service flow to the optical line terminal. In this way, the identifier of the to-be-transmitted service flow in the mobile network and the quality of service characteristic identifier of the to-be-transmitted service flow are introduced into a fixed-mobile convergence network, and when the service flow is scheduled, scheduling is performed based on the quality of service characteristic identifier of the to-be-transmitted service flow, which is consistent with a scheduling manner in the mobile network. Therefore, scheduling of the to-be-transmitted service flow is not delayed.

BRIEF DESCRIPTION OF THE DRAWINGS

FIG. 2 is a schematic diagram of a relationship between a GEM port and a T-CONT according to an embodiment of this application;

FIG. 3 is a schematic diagram of a fixed-mobile convergence network according to an embodiment of this application;

FIG. 4 is a flowchart of a data transmission method according to an embodiment of this application;

DETAILED DESCRIPTION OF ILLUSTRATIVE EMBODIMENTS

Figure 1:
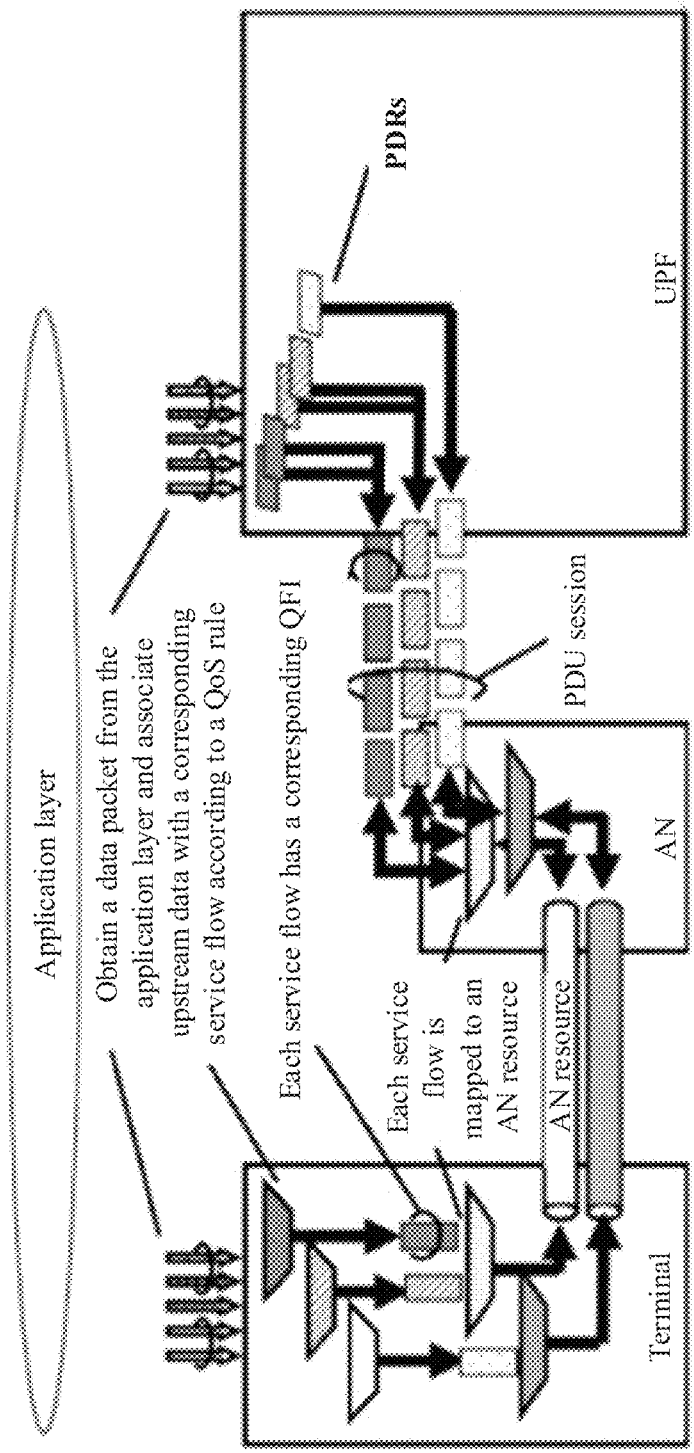
FIG. 1 is a schematic diagram of mapping a service flow in a 5G network according to this application.

There are a large quantity of network services that can be customized based on QoS flows in a 5G network. Specifically, the 5G network supports a guaranteed bit rate (GBR) service flow and a non-guaranteed bit rate (Non-GBR) service flow, and a 5G QoS model further supports reflective QoS. The service flow is a most refined QoS distinction granularity of a PDU session. A difference between two PDU sessions lies in their different service flows. In the 5G network, one QFI is used to identify one QoS flow. User plane data with a same QFI in the PDU session obtains same forwarding processing, for example, same scheduling and same admission threshold. One PDU session may have a plurality of service flows, but a QFI of each service flow is different, and QFIs of two PDU sessions of a terminal may be the same. In the 5G network, a service flow has the following characteristics.

1. QoS configuration on an access network (AN) side, where the configuration may be that a session management function (SMF) network element provides the QoS configuration for the AN by using an access and mobility management function (AMF) network element. Alternatively, the QoS configuration is preconfigured for the AN. QoS configuration (namely, a QoS characteristic) of one service flow is indexed by using a 5G quality identifier (5QI). The QoS configuration includes: (1) Allocation and retention priority (Allocation and Retention Priority, ARP), including information such as a priority, a preemption capability, and preemption vulnerability. The priority defines importance of a terminal resource request. When system resources are limited, an ARP parameter determines whether a new service flow is to be accepted or rejected. The ARP ranges from 1 to 15. The value 1 indicates a highest priority. (2) Reflective QoS attribute (RQA): The RQA is an optional parameter, which indicates that some services on the service flow may be affected by reflective QoS. Only when a core network allocates an RQA parameter of a service flow to the AN by using signaling, the AN can enable a reflective QoS indication (RQI) to perform transmission on a radio resource of the flow. (3) Notification control: For a GBR service flow, the core network controls, by using the parameter, whether a next generation-radio access network (NG-RAN) reports a message to notify the core network when a guaranteed flow bit rate (GFBR) of the GBR service flow cannot be met. (4) Flow bit rate: For a GBR service flow, the flow bit rate is divided into GFBR-upstream/downstream and maximum flow bit rate (MFBR)-upstream/downstream. The GFBR indicates a bit rate guaranteed by a network to provide for a service flow in an average time window. The MFBR limits a bit rate to a highest bit rate expected by a service flow. (5) Per session aggregate maximum bit rate (Session-AMBR): Each PDU session has a session-AMBR. The session-AMBR is a subscription parameter, which defines an upper limit of a sum of bit rates of all non-GBR service flows of one PDU session. The session-AMBR is not applicable to a GBR service flow. (6) Per UE aggregate maximum bit rate (UE-AMBR): Each terminal has a UE-AMBR. The UE-AMBR defines an upper limit of a sum of bit rates of all non-GBR service flows of one terminal. The UE-AMBR is not applicable to a GBR service flow.

2. QoS rules on a terminal side. These rules are provided by the SMF for a terminal in a PDU establishment or modification procedure, or are derived by the terminal by using a reflective QoS mechanism. These QoS rules may be implicitly provided to the terminal, or preconfigured for the terminal, or implicitly derived by the terminal by using the reflective QoS mechanism. The terminal may associate upstream data with a corresponding service flow according to the QoS rule.

FIG. 1 is a schematic diagram of mapping a service flow in a 5G network according to this application. As shown in FIG. 1, for upstream data, a terminal associates the upstream data with a corresponding service flow according to a QoS rule, each service flow has a corresponding QFI, and each service flow is mapped to an AN resource, that is, a radio bearer (RB), and is transmitted upward. As described above, the SMF provides the QoS configuration for the AN side, where the configuration includes the 5QI. In other words, when the AN side performs upstream transmission on a service flow, scheduling is implemented based on a 5QI of the service flow.

As described above, a GPON uses a GEM, and can bear a plurality of services and provide quality of service guarantee for various types of services, which shows the potential of a broadband optical access technology in the future. A T-CONT is a container for bearing a service in an upstream direction of the GPON. All GEM ports need to be mapped to the T-CONT, and an OLT transmits a service flow to a core network side through DBA scheduling. Each T-CONT is uniquely identified by an Alloc-ID. FIG. 2 is a schematic diagram of a relationship between a GEM port and a T-CONT according to an embodiment of this application. As shown in FIG. 2, one GEM port may be mapped to one T-CONT, and a plurality of GEM ports may also be mapped to one T-CONT. However, one T-CONT includes a plurality of T-CONT queues, and an ONU may schedule service flows in the T-CONT queues based on 802.1p carried in a packet.

However, when upstream transmission is performed on a service flow in a 5G customized service in the GPON, in a conventional technology, a QoS characteristic of the service flow cannot be considered for such upstream data transmission in the GPON. In other words, scheduling manners for such service flows in the GPON and the 5G network are inconsistent. As a result, scheduling of such service flows may be delayed.

To resolve the foregoing technical problem, this application provides a data transmission method and apparatus, a gateway, a chip, and a storage medium. An inventive concept of this application is to introduce a 5QI in a mobile communications network into a PON, to perform service flow scheduling based on the 5QI.

The technical solution of this application is applicable to a fixed-mobile convergence network, that is, a convergence network of the PON and the mobile communications network. For example, FIG. 3 is a schematic diagram of a fixed-mobile convergence network according to an embodiment of this application. As shown in FIG. 3, a terminal 31 is connected to an optical line terminal 33 by using a gateway 32, and the optical line terminal 33 accesses a wireless core network by using an AN.

The terminal 31 may be a wireless terminal. The wireless terminal may be a device that provides a user with voice and/or data connectivity, a handheld device with a wireless connection function, or another processing device connected to a wireless modem. The wireless terminal may communicate with at least one core network through a radio access network (RAN). The wireless terminal may be a mobile terminal such as a mobile phone (or referred to as a "cellular" phone) and a computer with a mobile terminal. For example, the wireless terminal may be a portable, pocket-sized, handheld, computer built-in, or in-vehicle mobile apparatus, which exchanges voice and/or data with the radio access network. The wireless terminal may also be referred to as a subscriber unit, a subscriber station, a mobile station, a remote station, an access point, a remote terminal, an access terminal, a user terminal, user equipment (UE), or a user agent. This is not limited herein.

The gateway may be a next generation-residential gateway (NG-RG), and the gateway is configured to connect the terminal to a fixed-mobile convergence core network. In this application, the gateway refers to a user gateway in upstream of a PON.

The optical line terminal 33 may be an OLT in the PON, and is configured to forward a service flow of the gateway 32 to an upper layer network after being accessed and converged by using a PON technology.

The AN may use a global system for mobile communications (GSM), code division multiple access (CDMA), wideband code division multiple access (WCDMA), long term evolution (LTE), a 5G or new radio technology, a future 6G technology, or the like. Correspondingly, the core network may be a core network corresponding to the AN, for example, a 5G core network (5GC).

FIG. 4 is a flowchart of a data transmission method according to an embodiment of this application. The method is applied to a part or all of a gateway. The part of the gateway may be a processor, a processing unit, a chip, or the like in the gateway. The following describes the technical solutions of this application by using the gateway as an execution body. As shown in FIG. 4, the method includes the following steps.

Step S401: The gateway maps a to-be-transmitted service flow to a virtual connection based on a mapping relationship between an identifier of the to-be-transmitted service flow in a mobile network and an identifier of the virtual connection.

The to-be-transmitted service flow is also referred to as a to-be-transmitted QoS flow, and a terminal may associate to-be-transmitted upstream data with a corresponding to-be-transmitted service flow according to a QoS rule. The identifier of the to-be-transmitted service flow in the mobile network is used to uniquely identify the service flow in a PDU session. The identifier of the to-be-transmitted service flow in the mobile network may be a 5QI in a 5G network. This is not limited in this application.

In a GPON, a GEM may be used to bear a plurality of services. Therefore, a plurality of virtual connections may exist between the gateway and an optical line terminal, and each virtual connection is used to bear one or more services. Each virtual connection may be referred to as a logical connection, a GEM connection, a virtual channel, a logical channel, or the like. Each virtual connection has a corresponding GEM port, and the virtual connection may be uniquely identified by using a GEM port identifier (GEM Port ID, Gemport ID). The virtual connection in step S401 is a virtual connection between the gateway and the optical line terminal that are corresponding to the to-be-transmitted service, and the identifier of the virtual connection is a GEM port ID corresponding to the virtual connection.

A network may obtain the mapping relationship between the identifier of the to-be-transmitted service flow in the mobile network and the identifier of the virtual connection in at least the following optional manners, which are not limitative.

Optional manner 1: The mapping relationship between the identifier of the to-be-transmitted service flow in the mobile network and the identifier of the virtual connection is preconfigured for the gateway. For example, a core network device, such as an SMF network element, preconfigures the mapping relationship between the identifier of the to-be-transmitted service flow in the mobile network and the identifier of the virtual connection for the gateway.

Optional manner 2: The mapping relationship between the identifier of the to-be-transmitted service flow in the mobile network and the identifier of the virtual connection is preconfigured for the terminal. For example, a core network device, such as an SMF network element, preconfigures the mapping relationship between the identifier of the to-be-transmitted service flow in the mobile network and the identifier of the virtual connection for the terminal. Further, the terminal sends the mapping relationship between the identifier of the to-be-transmitted service flow in the mobile network and the identifier of the virtual connection to the gateway. In this case, the gateway does not need to store or cache mapping relationships between identifiers of to-be-transmitted service flows corresponding to all terminals in the mobile network and identifiers of virtual connections, so that storage pressure of the gateway can be reduced.

For example, the mapping relationship between the identifier of the to-be-transmitted service flow in the mobile network and the identifier of the virtual connection may be a mapping relationship shown in Table 1.

TABLE 1

| Service flow | QFI | Gemport ID |
| --- | --- | --- |
| Game service flow | QFI-a | Gemport 1 |
| Over the top (Over The Top, OTT) video service flow | QFI-b | Gemport 2 |
| Conference call service flow | QFI-c | Gemport 2 |
| Web browsing service flow | QFI-d | Gemport 3 |

As shown in Table 1, if the to-be-transmitted service flow is the game service flow in Table 1, based on the mapping relationship shown in the first row of Table 1, the gateway should map the game service flow to a virtual connection identified by the Gemport 1.

Step S402: The gateway maps the to-be-transmitted service flow to a virtual bearer based on a mapping relationship between the identifier of the virtual connection and an identifier of the virtual bearer.

The virtual bearer is a container for bearing a service in an upstream direction of a GPON. The virtual bearer is also referred to as a transmission container T-CONT. All virtual connections or Gemports need to be mapped to the virtual bearer. The optical line terminal transmits the service flow to a core network side through DBA scheduling. The virtual bearer is an upstream traffic scheduling unit of DBA. Each virtual bearer is uniquely identified by an Alloc-ID. The Alloc-ID is allocated by each GPON port of the optical line terminal. In other words, gateways on a same GPON port of the optical line terminal do not have virtual bearers with a same Alloc-ID. The virtual bearer in step S402 is a virtual bearer between the gateway and the optical line terminal that are corresponding to the virtual connection in step S401, that is, a virtual bearer between the gateway and the optical line terminal that are corresponding to the to-be-transmitted service flow.

One virtual connection may be mapped to one virtual bearer, and a plurality of virtual connections may also be mapped to a same virtual bearer.

Step S403: The gateway maps the to-be-transmitted service flow to a virtual bearer queue based on a mapping relationship between a quality of service characteristic identifier of the to-be-transmitted service flow and an identifier of the virtual bearer queue in the virtual bearer, to transmit the to-be-transmitted service flow to the optical line terminal.

The quality of service (QoS) characteristic identifier of the to-be-transmitted service flow is used to identify a QoS characteristic corresponding to the to-be-transmitted service flow. The QoS characteristic is also referred to as QoS configuration. In the 5G network, the identifier is a 5QI, and the QoS characteristic represented by the identifier includes: an ARP, an RQA, notification control, a flow bit rate, a session-AMBR, and a UE-AMBR.

Each virtual bearer has at least one virtual bearer queue. For example, each T-CONT has eight T-CONT queues.

Each service flow has a corresponding quality of service characteristic identifier. For example, it is assumed that the quality of service characteristic identifier herein is the 5QI, and the identifier of the service flow in the mobile network is a QFI. For example, a mapping relationship between the 5QI and the QFI of the service flow is shown in Table 2.

TABLE 2

| Service flow | QFI | 5QI |
| --- | --- | --- |
| Game service flow | QFI-a | 10 |
| OTT video service flow | QFI-b | 11 |
| Conference call service flow | QFI-c | 20 |
| Web browsing service flow | QFI-d | 21 |

The network may obtain the mapping relationship between the quality of service characteristic identifier of the to-be-transmitted service flow and the identifier of the virtual bearer queue in the virtual bearer in at least the following optional manners, which are not limitative.

Optional manner 1: The mapping relationship between the quality of service characteristic identifier of the to-be-transmitted service flow and the identifier of the virtual bearer queue is preconfigured for the gateway. For example, a core network device, such as an SMF network element, preconfigures the mapping relationship between the quality of service characteristic identifier of the to-be-transmitted service flow and the identifier of the virtual bearer queue for the gateway.

Optional manner 2: The mapping relationship between the quality of service characteristic identifier of the to-be-transmitted service flow and the identifier of the virtual bearer queue is preconfigured for the terminal. For example, a core network device, such as an SMF network element, preconfigures the mapping relationship between the quality of service characteristic identifier of the to-be-transmitted service flow and the identifier of the virtual bearer queue for the terminal. Further, the terminal sends the mapping relationship between the quality of service characteristic identifier of the to-be-transmitted service flow and the identifier of the virtual bearer queue to the gateway. In this case, the gateway does not need to store or cache mapping relationships between quality of service characteristic identifiers of to-be-transmitted service flows corresponding to all terminals and identifiers of virtual bearer queues, so that storage pressure of the gateway can be reduced.

For example, the mapping relationship between the quality of service characteristic identifier of the to-be-transmitted service flow and the identifier of the virtual bearer queue may be a mapping relationship shown in Table 3.

TABLE 3

| Service flow | 5QI | Identifier of a virtual bearer queue |
| --- | --- | --- |
| Game service flow | 10 | 7 |
| OTT video service flow | 11 | 5 |
| Conference call service flow | 20 | 6 |
| Web browsing service flow | 21 | 0 |

As shown in Table 3, if the to-be-transmitted service flow is the game service flow in Table 3, the gateway maps, based on the mapping relationship shown in the first row of Table 3, the game service flow to a queue identified by the identifier 7 of the virtual bearer queue. Based on this, the gateway transmits the to-be-transmitted service flow to the optical line terminal by scheduling the queue identified by the identifier 7.

Optionally, a higher priority of the to-be-transmitted service flow indicates a higher priority of the virtual bearer queue. For example, an ARP parameter of the to-be-transmitted service flow determines the priority of the to-be-transmitted service flow. A higher priority indicates a higher priority of a corresponding virtual bearer queue. As shown in Table 3, after the 5QI parameter of the service flow is determined, the ARP parameter included in the QoS configuration indexed by the 5QI is also determined, that is, the priority is determined, and the priority is consistent with the priority of the virtual bearer queue. Assuming that a priority order of each service flow in column 1 of Table 3 is: the game service flow>the OTT video service flow>the conference call service flow>the web browsing service flow, a priority order of virtual bearer queues is: the virtual bearer queue 7>the virtual bearer queue 5>the virtual bearer queue 6>the virtual bearer queue 0.

Optionally, after obtaining the to-be-transmitted service flow, the optical line terminal transmits the to-be-transmitted service flow to a wireless core network by using an AN, so that the core network performs corresponding processing on the to-be-transmitted service flow.

Figure 5:
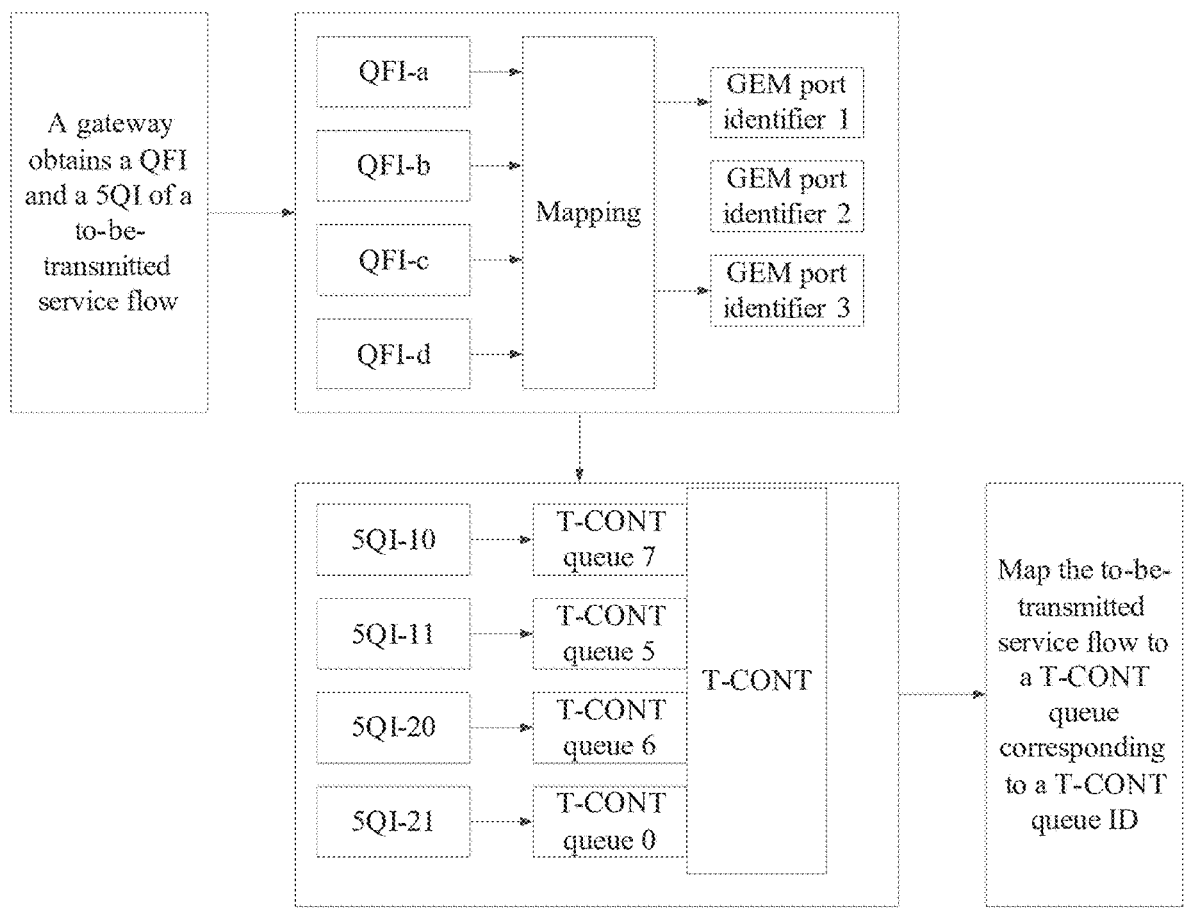
FIG. 5 is a schematic diagram of a data transmission method according to this application.

It is assumed that the identifier of the to-be-transmitted service flow in the mobile network is the QFI, the quality of service characteristic identifier of the to-be-transmitted service flow is the 5QI, the identifier of the virtual connection is the GEM port identifier, and the virtual bearer is the T-CONT. As shown in FIG. 5, the gateway first obtains the QFI and the 5QI of the to-be-transmitted service flow, determines a GEM port identifier corresponding to the to-be-transmitted service flow based on a mapping relationship between a QFI of each service flow and a GEM port identifier, maps the to-be-transmitted service flow to a corresponding T-CONT based on a correspondence between a GEM port and the T-CONT, determines a T-CONT queue ID corresponding to the to-be-transmitted service flow based on a mapping relationship between the 5QI of each service flow and the T-CONT queue ID, and finally maps the to-be-transmitted service flow to a T-CONT queue corresponding to the T-CONT queue ID.

In conclusion, this application provides a data transmission method, including: The gateway maps the to-be-transmitted service flow to the virtual connection based on the mapping relationship between the identifier of the to-be-transmitted service flow in the mobile network and the identifier of the virtual connection, maps the to-be-transmitted service flow to the virtual bearer based on the mapping relationship between the identifier of the virtual connection and the identifier of the virtual bearer, and maps the to-be-transmitted service flow to the virtual bearer queue based on the mapping relationship between the quality of service characteristic identifier of the to-be-transmitted service flow and the identifier of the virtual bearer queue in the virtual bearer, to transmit the to-be-transmitted service flow to the optical line terminal. In this way, the identifier of the to-be-transmitted service flow in the mobile network and the quality of service characteristic identifier of the to-be-transmitted service flow are introduced into a fixed-mobile convergence network, and when the service flow is scheduled, scheduling is performed based on the quality of service characteristic identifier of the to-be-transmitted service flow, which is consistent with a scheduling manner in the mobile network. Therefore, scheduling of the to-be-transmitted service flow is not delayed. Further, the mapping relationship between the identifier of the to-be-transmitted service flow in the mobile network and the identifier of the virtual connection is preconfigured for the terminal. In this case, the gateway does not need to store or cache mapping relationships between identifiers of to-be-transmitted service flows corresponding to all terminals in the mobile network and identifiers of virtual connections, so that storage pressure of the gateway can be reduced. Similarly, the mapping relationship between the quality of service characteristic identifier of the to-be-transmitted service flow and the identifier of the virtual bearer queue is preconfigured for the terminal. In this case, the gateway does not need to store or cache mapping relationships between quality of service characteristic identifiers of to-be-transmitted service flows corresponding to all terminals and identifiers of virtual bearer queues, so that storage pressure of the gateway can be reduced. Further, a higher priority of the to-be-transmitted service flow indicates a higher priority of the virtual bearer queue. Based on this, it can be ensured that a service flow with a higher priority in the mobile network is preferentially scheduled in the fixed-mobile convergence network.

Figure 6:
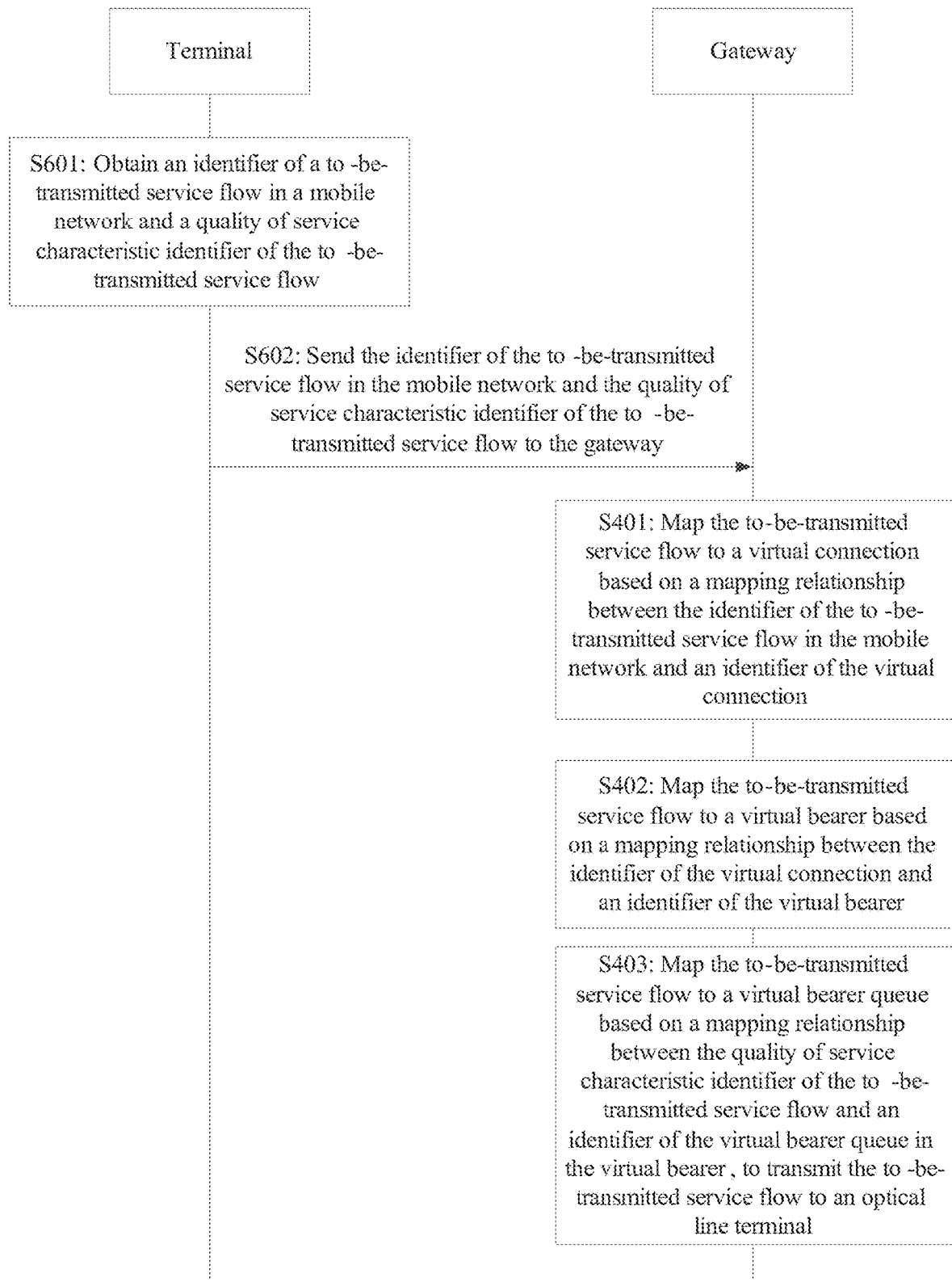
FIG. 6 is a flowchart of a data transmission method according to another embodiment of this application.

FIG. 6 is a flowchart of a data transmission method according to another embodiment of this application. Network elements involved in the method include a part or all of a gateway and a part or all of a terminal. The part of the gateway may be a processor, a processing unit, a chip, or the like in the gateway. The part of the terminal may be a processor, a processing unit, a chip, or the like in the terminal. The following describes the technical solution of this application by using the gateway and the terminal as execution bodies. As shown in FIG. 6, before step S401, the method further includes the following steps.

Step S601: The terminal obtains an identifier of a to-be-transmitted service flow in a mobile network and a quality of service characteristic identifier of the to-be-transmitted service flow.

An operator server performs QoS planning on service traffic based on a subscribed service of a user, and delivers a mapping relationship between a service identification rule and the identifier of the service flow in the mobile network to the terminal. The terminal performs matching on the service flow according to the service identification rule, maps the service flow to a corresponding identifier in the mobile network, and identifies the quality of service characteristic identifier of the service flow, to identify priorities of different services. For example, Table 2 shows QFIs and 5QIs corresponding to different service flows.

Step S602: The terminal sends the identifier of the to-be-transmitted service flow in the mobile network and the quality of service characteristic identifier of the to-be-transmitted service flow to the gateway.

After receiving the to-be-transmitted service flow, the gateway may obtain, by parsing based on a format of the to-be-transmitted service flow, the identifier of the to-be-transmitted service flow in the mobile network and the quality of service characteristic identifier of the to-be-transmitted service flow.

In conclusion, in this application, the terminal may obtain the identifier of the to-be-transmitted service flow in the mobile network and the quality of service characteristic identifier of the to-be-transmitted service flow, and transmit the two identifiers to the gateway. Therefore, the gateway introduces the identifier of the to-be-transmitted service flow in the mobile network and the quality of service characteristic identifier into a fixed-mobile convergence network, and performs scheduling based on the quality of service characteristic identifier of the to-be-transmitted service flow when scheduling the service flow, which is consistent with a scheduling manner in the mobile network. Therefore, scheduling of the to-be-transmitted service flow is not delayed.

Figure 7:
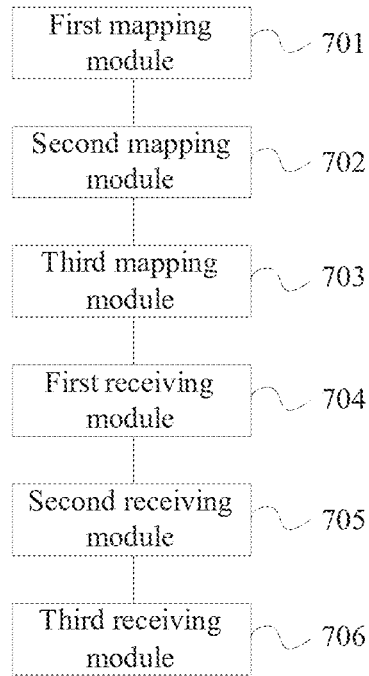
FIG. 7 is a schematic diagram of a data transmission apparatus according to an embodiment of this application.

FIG. 7 is a schematic diagram of a data transmission apparatus according to an embodiment of this application. The data transmission apparatus is a part or all of the foregoing gateway. As shown in FIG. 7, the apparatus includes: a first mapping module 701, configured to map a to-be-transmitted service flow to a virtual connection based on a mapping relationship between an identifier of the to-be-transmitted service flow in a mobile network and an identifier of the virtual connection, where the virtual connection is a virtual connection between a gateway and an optical line terminal that are corresponding to the to-be-transmitted service; a second mapping module 702, configured to map the to-be-transmitted service flow to a virtual bearer based on a mapping relationship between the identifier of the virtual connection and an identifier of the virtual bearer, where the virtual bearer is a virtual bearer between the gateway and the optical line terminal that are corresponding to the virtual connection; and a third mapping module 703, configured to map the to-be-transmitted service flow to a virtual bearer queue based on a mapping relationship between a quality of service characteristic identifier of the to-be-transmitted service flow and an identifier of the virtual bearer queue in the virtual bearer, to transmit the to-be-transmitted service flow to the optical line terminal.

Optionally, a higher priority of the to-be-transmitted service flow indicates a higher priority of the virtual bearer queue.

Optionally, the mapping relationship between the identifier of the to-be-transmitted service flow in the mobile network and the identifier of the virtual connection is preconfigured for the gateway.

Alternatively, the mapping relationship between the identifier of the to-be-transmitted service flow in the mobile network and the identifier of the virtual connection is preconfigured for the terminal. Correspondingly, the apparatus further includes: a first receiving module 704, configured to receive the mapping relationship that is between the identifier of the to-be-transmitted service flow in the mobile network and the identifier of the virtual connection and that is sent by the terminal.

Optionally, the mapping relationship between the quality of service characteristic identifier of the to-be-transmitted service flow and the identifier of the virtual bearer queue is preconfigured for the gateway.

Alternatively, the mapping relationship between the quality of service characteristic identifier of the to-be-transmitted service flow and the identifier of the virtual bearer queue is preconfigured for the terminal. Correspondingly, the apparatus further includes: a second receiving module 705, configured to receive the mapping relationship that is between the quality of service characteristic identifier of the to-be-transmitted service flow and the identifier of the virtual bearer queue and that is sent by the terminal.

Optionally, the apparatus further includes: a third receiving module 706, configured to receive the identifier that is of the to-be-transmitted service flow in the mobile network and that is sent by the terminal, and the quality of service characteristic identifier that is of the to-be-transmitted service flow and that is sent by the terminal.

The data transmission apparatus provided in this application may be configured to perform the foregoing data transmission method. For corresponding content and effects of the data transmission apparatus, refer to the method embodiments. Details are not described herein again.

Figure 8:
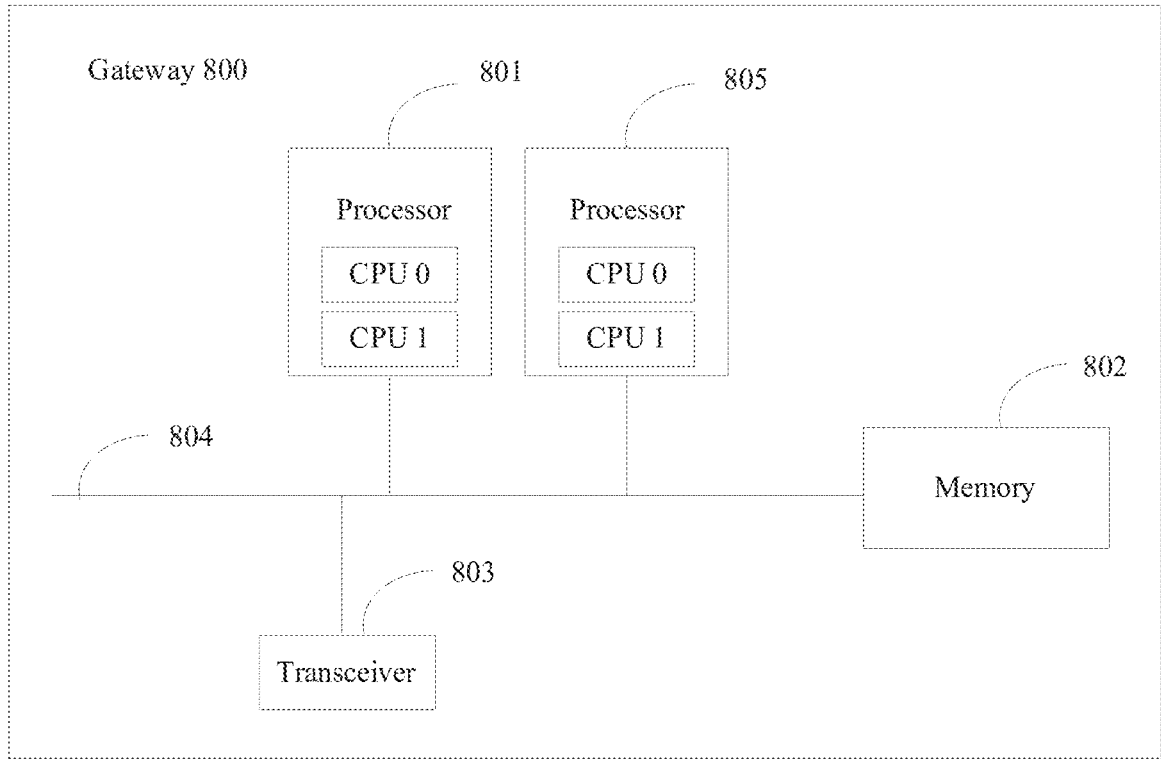
FIG. 8 is a schematic diagram of a gateway 800 according to an embodiment of this application.

FIG. 8 is a schematic diagram of a gateway 800 according to an embodiment of this application. As shown in FIG. 8, components of the gateway are specifically described below with reference to FIG. 8. A processor 801 is a control center of the gateway, and may be one processor, or may be a general term of a plurality of processing elements. For example, the processor 801 is a central processing unit (CPU), an application-specific integrated circuit (ASIC), or one or more integrated circuits configured to implement the embodiments of this application, for example, one or more microprocessors, or one or more field programmable gate arrays (FPGAs).

The processor 801 may execute various functions of the gateway by running or executing a software program stored in a memory 802 and invoking data stored in the memory 802.

During specific implementation, in an embodiment, the processor 801 may include one or more CPUs, for example, a CPU 0 and a CPU 1 in FIG. 8.

During specific implementation, in an embodiment, the gateway may include a plurality of processors such as the processor 801 and a processor 805 shown in FIG. 8. Each of the processors may be a single-core (single-CPU) processor or may be a multi-core (multi-CPU) processor. The processor herein may be one or more gateways, circuits, and/or processing cores configured to process data (for example, computer program instructions).

The memory 802 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, or an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer, but is not limited thereto. The memory 802 may exist independently, and is connected to the processor 801 through a communications bus 804. The memory 802 may alternatively be integrated with the processor 801.

The memory 802 is configured to store a software program for executing the solutions of this application, and the processor 801 controls execution, to implement the method provided in the foregoing method embodiments.

A transceiver 803 is configured to communicate with another gateway. Certainly, the transceiver 803 may be further configured to communicate with a communications network, for example, the Ethernet, a radio access network (RAN), or a wireless local area network (WLAN). The transceiver 803 may include a receiving unit for implementing a receiving function and a sending unit for implementing a sending function.

The communications bus 804 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 8, but this does not mean that there is only one bus or only one type of bus.

The gateway structure shown in FIG. 8 does not constitute a limitation on the gateway. The gateway may include more or fewer components than those shown in the figure, or some components may be combined, or different component arrangements may be used.

The gateway provided in this application may be configured to perform the foregoing data transmission method. For corresponding content and effects of the gateway, refer to the method embodiments. Details are not described herein again.

This application further provides a chip. The chip is configured to perform the foregoing data transmission method. For corresponding content and effects of the chip, refer to the method embodiments. Details are not described herein again.

This application further provides a non-transitory computer-readable storage medium that stores computer instructions. The computer instructions are used to enable a computer to perform the foregoing data transmission method. For corresponding content and effects of the non-transitory computer-readable storage medium, refer to the method embodiments. Details are not described herein again.

This application further provides a computer program product. The computer program product includes computer instructions, and the computer instructions are used to enable a computer to perform the foregoing data transmission method. For corresponding content and effects of the computer program product, refer to the method embodiments. Details are not described herein again.

What is claimed is:

1. A method, applied to a part or all of a gateway, the method comprising: mapping a to-be-transmitted service flow to a virtual connection based on a mapping relationship between an identifier of the to-be-transmitted service flow in a mobile network and an identifier of the virtual connection, wherein the virtual connection is between the gateway and an optical line terminal that each correspond to the to-be-transmitted service flow; mapping the to-be-transmitted service flow to a virtual bearer based on a mapping relationship between the identifier of the virtual connection and an identifier of the virtual bearer, wherein the virtual bearer is between the gateway and the optical line terminal that each correspond to the virtual connection;

receiving a mapping relationship that is between a quality of service characteristic identifier of the to-be-transmitted service flow and an identifier of a virtual bearer queue and that is sent by the optical line terminal; and mapping the to-be-transmitted service flow to the virtual bearer queue based on the mapping relationship between the quality of service characteristic identifier of the to-be-transmitted service flow and the identifier of the virtual bearer queue in the virtual bearer, to transmit the to-be-transmitted service flow to the optical line terminal, wherein the mapping relationship between the quality of service characteristic identifier of the to-be-transmitted service flow and the identifier of the virtual bearer queue is preconfigured for the optical line terminal.

2. The method according to claim 1, wherein a higher priority of the to-be-transmitted service flow indicates a higher priority of the virtual bearer queue.

3. The method according to claim 1, wherein the mapping relationship between the identifier of the to-be-transmitted service flow in the mobile network and the identifier of the virtual connection is preconfigured for the gateway.

4. The method according to claim 1, wherein the mapping relationship between the identifier of the to-be-transmitted service flow in the mobile network and the identifier of the virtual connection is preconfigured for the optical line terminal; and wherein the method further comprises:
receiving the mapping relationship that is between the identifier of the to-be-transmitted service flow in the mobile network and the identifier of the virtual connection and that is sent by the optical line terminal.

5. The method according to claim 1, further comprising:
before mapping the to-be-transmitted service flow to the virtual connection based on the mapping relationship between the identifier of the to-be-transmitted service flow in the mobile network and the identifier of the virtual connection, receiving the identifier that is of the to-be-transmitted service flow in the mobile network and that is sent by the optical line terminal, and the quality of service characteristic identifier that is of the to-be-transmitted service flow and that is sent by the optical line terminal.

6. A gateway, comprising:
at least one processor; and
a non-transitory memory communicatively connected to the at least one processor; and
wherein the non-transitory memory stores instructions that are executable by the at least one processor, and the instructions comprise instructions for:
receiving an identifier of a to-be-transmitted service flow in a mobile network and a quality of service characteristic identifier of the to-be-transmitted service flow;
after receiving the identifier of the to-be-transmitted service flow in the mobile network and the quality of service characteristic identifier of the to-be-transmitted service flow, mapping the to-be-transmitted service flow to a virtual connection based on a mapping relationship between the identifier of the to-be-transmitted service flow in the mobile network and an identifier of the virtual connection, wherein the virtual connection is between the gateway and an optical line terminal that each correspond to the to-be-transmitted service flow;
mapping the to-be-transmitted service flow to a virtual bearer based on a mapping relationship between the identifier of the virtual connection and an identifier of the virtual bearer, wherein the virtual bearer is between the gateway and the optical line terminal that each correspond to the virtual connection; and
mapping the to-be-transmitted service flow to a virtual bearer queue based on a mapping relationship between the quality of service characteristic identifier of the to-be-transmitted service flow and an identifier of the virtual bearer queue in the virtual bearer, to transmit the to-be-transmitted service flow to the optical line terminal.

7. The gateway according to claim 6, wherein a higher priority of the to-be-transmitted service flow indicates a higher priority of the virtual bearer queue.

8. The gateway according to claim 6, wherein the mapping relationship between the identifier of the to-be-transmitted service flow in the mobile network and the identifier of the virtual connection is preconfigured for the gateway.

9. The gateway according to claim 6, wherein the mapping relationship between the identifier of the to-be-transmitted service flow in the mobile network and the identifier of the virtual connection is preconfigured for the optical line terminal; and wherein the instructions further comprise instructions for:
receiving the mapping relationship that is between the identifier of the to-be-transmitted service flow in the mobile network and the identifier of the virtual connection and that is sent by the optical line terminal.

10. The gateway according to claim 6, wherein the mapping relationship between the quality of service characteristic identifier of the to-be-transmitted service flow and the identifier of the virtual bearer queue is preconfigured for the gateway.

11. The gateway according to claim 6, wherein the mapping relationship between the quality of service characteristic identifier of the to-be-transmitted service flow and the identifier of the virtual bearer queue is preconfigured for the optical line terminal; and wherein the instructions further comprise instructions for:
receiving the mapping relationship that is between the quality of service characteristic identifier of the to-be-transmitted service flow and the identifier of the virtual bearer queue and that is sent by the optical line terminal.

12. A non-transitory computer-readable storage medium storing instructions that are executable by at least one processor, the instructions including instructions to: map a to-be-transmitted service flow to a virtual connection based on a mapping relationship between an identifier of the to-be-transmitted service flow in a mobile network and an identifier of the virtual connection, wherein the virtual connection is between a gateway and an optical line terminal that each correspond to the to-be-transmitted service flow; map the to-be-transmitted service flow to a virtual bearer based on a mapping relationship between the identifier of the virtual connection and an identifier of the virtual bearer, wherein the virtual bearer is between the gateway and the optical line terminal that each correspond to the virtual connection; map the to-be-transmitted service flow to a virtual bearer queue based on a mapping relationship between a quality of service characteristic identifier of the to-be-transmitted service flow and an identifier of the virtual bearer queue in the virtual bearer, to transmit the to-be-transmitted service flow to the optical line terminal; and before mapping the to-be-transmitted service flow to the virtual connection based on the mapping relationship between the identifier of the to-be-transmitted service flow in the mobile network and the identifier of the virtual connection, receive the identifier that is of the to-be-transmitted service flow in the mobile network and that is sent by the optical line terminal, and the quality of service characteristic identifier that is of the to-be-transmitted service flow and that is sent by the optical line terminal.

13. The non-transitory computer-readable storage medium storing according to claim 12, wherein a higher priority of the to-be-transmitted service flow indicates a higher priority of the virtual bearer queue.

14. The non-transitory computer-readable storage medium storing according to claim 12, wherein the mapping relationship between the identifier of the to-be-transmitted service flow in the mobile network and the identifier of the virtual connection is preconfigured for the gateway.

15. The non-transitory computer-readable storage medium storing according to claim 12, wherein the mapping relationship between the identifier of the to-be-transmitted service flow in the mobile network and the identifier of the virtual connection is preconfigured for the optical line terminal; and wherein the instructions further include instructions to: receive the mapping relationship that is between the identifier of the to-be-transmitted service flow in the mobile network and the identifier of the virtual connection and that is sent by the optical line terminal.

16. The non-transitory computer-readable storage medium according to claim 12, wherein the mapping relationship between the quality of service characteristic identifier of the to-be-transmitted service flow and the identifier of the virtual bearer queue is preconfigured for the gateway.

17. The non-transitory computer-readable storage medium according to claim 12, wherein the mapping relationship between the quality of service characteristic identifier of the to-be-transmitted service flow and the identifier of the virtual bearer queue is preconfigured for the optical line terminal.

18. The non-transitory computer-readable storage medium according to claim 12, wherein the instructions further include instructions to: receive the mapping relationship that is between the quality of service characteristic identifier of the to-be-transmitted service flow and the identifier of the virtual bearer queue and that is sent by the optical line terminal.

* * * * *